INVENTOR
H. MANN
BY R. B. Ardis
ATTORNEY

INVENTOR
H. MANN
BY
R. B. Anderson
ATTORNEY

INVENTOR
H. MANN
BY R. B. Andis
ATTORNEY 3,015,815

CONVERSION BETWEEN ANALOG AND DIGITAL INFORMATION ON A PIECEWISE-LINEAR BASIS

Henry Mann, Berkeley Heights, N.J., assignor to Bell Telephone Laboratories, Incorporated, New York, N.Y., a corporation of New York Filed May 18, 1959, Ser. No. 813,777
8 Claims. (Cl. 340—347)

This invention relates to digital transmission and, more specifically, to the nonlinear conversion of analog signals and digital signals, one to the other, by a piecewise-linear process.

The advantages of transmission by PCM (pulse code modulation), one increasingly important form of digital communication, over transmission by PAM (pulse amplitude modulation), a form of analog transmission, are well known in the art and will not be examined at length here. For a thorough exposition see, for example, the article "The Philosophy of PCM," by Oliver, Pierce, and Shannon, in volume 36, Proceedings of the I.R.E., pages 1324 to 1331 (1948); and H. S. Black, "Modulation Theory," Van Nostrand (1933). Suffice it to say that transmission of information by PCM offers many distinct advantages over other methods in that the information is digital in nature and may therefore be regenerated by repeaters judiciously deployed along the transmission path. The regeneration process substantially eliminates accumulation, in the course of transmission, of noise, crosstalk and other forms of signal degradation.

Prior to transmission, encoding, i.e., conversion of the original analog information to a pulse code, is necessary in a PCM system, and if the digital information thus transmitted is to be used in its original form, upon reception decoding is necessary. Before encoding the original information, it is necessary that it be quantized. In the quantizing process the exact value of the information at any instant is approximated by one of a number of discrete values commonly called quantum levels. The difference between the instantaneous value of the original information and the quantum level actually transmitted is called quantizing error and gives rise to what is known variously as quantizing noise or quantizing distortion.

Quantizing distortion is especially objectionable and very often intolerable when the instantaneous value of the original information is small, but is usually of no significance when the instantaneous value is large. For more effective transmission, it is therefore desirable to have more quantum levels available at low amplitudes of the signal in order to better define these amplitudes, thus reducing the relative quantizing error. Something is taken from the higher-valued amplitude signals and given to the lower-valued amplitude signals. Consequently, "companding" (a verbal contraction of the terms "compressing" and "expanding") may be advantageously used in a quantized-signal transmission system to balance the undesirable effects of quantizing error.

It is the dynamic range of the original information that is "compressed" in such a system. The dynamic range is reduced so that low amplitude samples of the original information are emphasized, i.e., effectively increased in amplitude, while the higher-valued amplitude samples are de-emphasized.

Companding therefore serves a special purpose in quantized transmission systems in that it reduces the magnitude of the quantizing error for low amplitude signals, where quantizing distortion would be a serious matter, at the price of increased quantizing error for higher amplitude signals, where increased distortion can be tolerated. Restated, the purpose of the PCM compander is to reduce the quantizing impairment of the original signal by, in effect, quantizing not on a uniform but on a non-uniform basis.

PCM systems have been devised that combine the processes of coding and compression at the transmitting end and the processes of decoding and expansion at the receiving end. Such a system is disclosed by R. L. Carbrey in a copending application, Serial No. 631,806, filed December 31, 1956, which has since issued as Patent No. 2,889,409. Illustrative of the Carbrey invention is the transmitting end of the system in which a nonlinear encoder automatically compresses its input signal as it carries out its coding operation. B. D. Smith discloses a method of nonlinear encoding by feedback methods in an article entitled "Coding by Feedback Methods," which appears in volume 41 of the Proceedings of the I.R.E., at page 1053.

In a copending application Serial No. 813,776, which was filed May 18, 1959, C. P. Villars discloses a system for nonlinearly converting analog and digital signals, one to the other, by a piecewise-linear process. It is to such a system that the instant invention is directed. As is true of the Villars arrangement, the piecewise-linear system disclosed here may be used to approximate almost any type of non-linearity while still retaining some of the simplicity of linear systems.

Difficulties present themselves, however, in the conversion between analog and digital signals by a piecewise-linear method. These will be fully understood as the description progresses, but terse mention of at least one at this point will impart meaning to the illustrative objects that follow. In the approximation of a desired nonlinear function, the reference current network must undergo many changes in logical response to preceding determinations. Reference current is supplied by the network to apparatus which will here be denoted simply as the decision element. The input impedance of the decision element is not, practically speaking, zero. Moreover, the output impedance of the reference current network will change with the network changes mentioned above. The non-zero input impedance of the decision element, coupled with the varying output impedance of the reference current network, will introduce undesired nonlinearities into the piecewise-linear process.

It is, therefore, a principal object of the present invention to improve the accuracy of piecewise-linear conversion between analog and digital signals. It is a related object to achieve such improvement with a minimal increase in system complexity.

In accordance with the invention, nonlinear conversion between analog and digital signals is achieved with precision and simplicity by a piecewise-linear process. The invention is embodied, for illustration, in the encoder of a PCM transmission system. The input samples and output code of the encoder, though not linearly related over the entire coding range, are constrained to be so related over subranges determined by the transition of predetermined digits in a permutation code of base *b* (the base two is used to illustrate the invention). The digit transitions define breakpoints in a piecewise-linear compression characteristic. Each segment of the characteristic defines a peculiar relation between a specified range of analog signal amplitude and a corresponding range of digital code. Undesired nonlinearities are avoided by rendering the output, or load-to-ground, impedance of the reference current generating network—referred to above and to be discussed in complete detail below—constant throughout the encoding process. This is accomplished by circuitry which is logically intercoupled with and responsive to the configuration of the reference current generating network.

The invention will be better understood from the following detailed description, given in conjunction with the appended drawings, in which.

Figure 1:
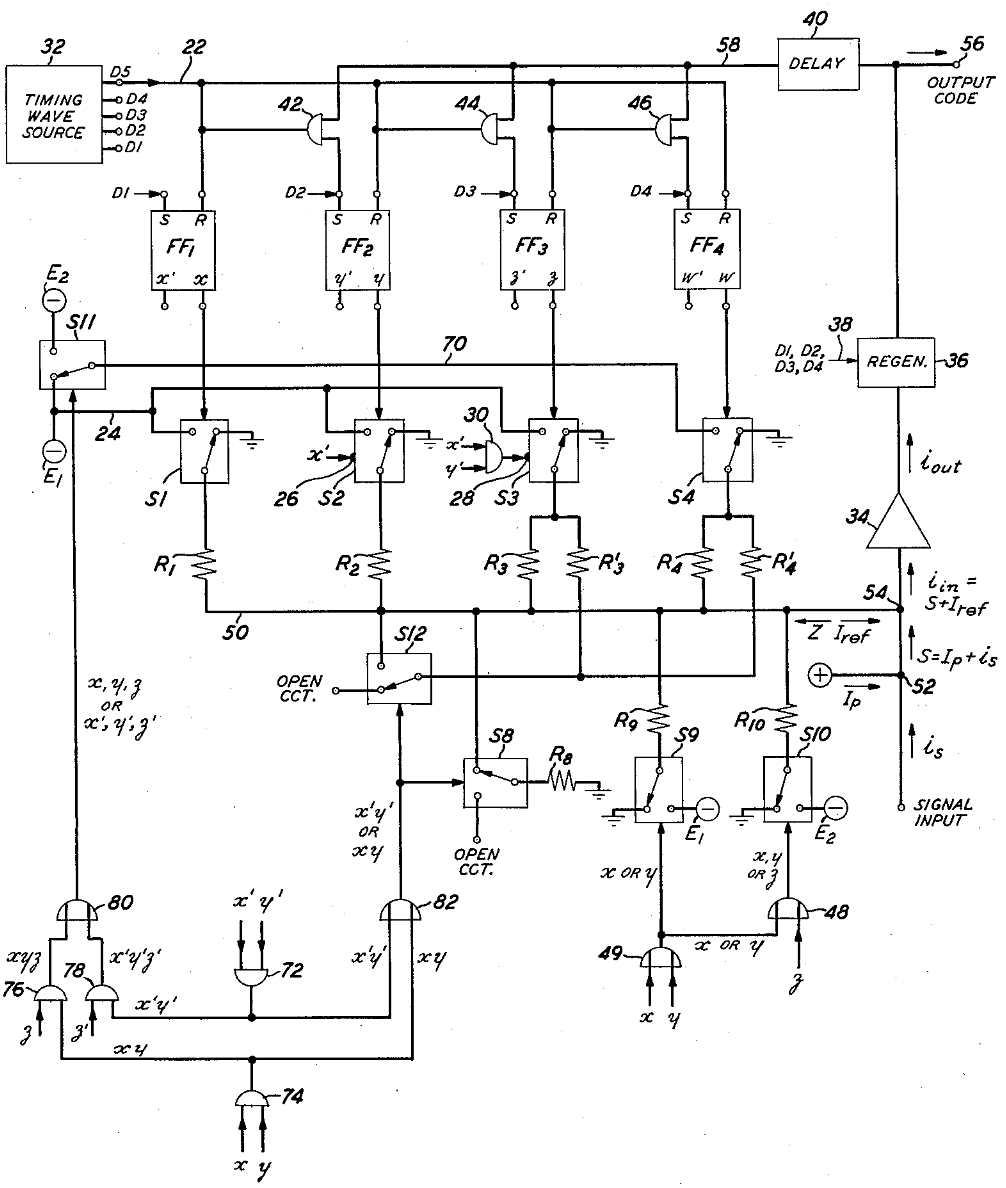
FIG. 1 is a block schematic circuit diagram depicting a piecewise-linear encoder embodying the invention.

For the sake of brevity and simplicity the present disclosure will concern the application of the principles of the invention to the encoding process only. This expedient is believed justified, since it is well known that principles applicable to encoding are equally applicable in a straightforward manner to the reverse process of decoding. Also, for ease of narration and understanding, the illustrative embodiment of FIG. 1 has been considerably simplified in that it converts analog information on a piecewise-linear basis to only a four-digit code, and has an encoding characteristic (see FIG. 2) having simply two breakpoints or three linear segments per quadrant. It should be understood, however, that in the practice of the invention the code may consist of any number of desired digits, the number being limited only by other considerations. The number of breakpoints which is used is determined not by any limitations of the invention, but rather by the degree with which a specified nonlinear characteristic is desired to be approximated.

In the description of the illustrative embodiment of FIG. 1, reference will be made at appropriate times to FIGS. 2 and 3 as aids in understanding the process occurring in the circuit of FIG. 1. Since FIGS. 2 and 3 will be referred to throughout the material that follows, they should be explained before embarking into the description of FIG. 1. FIG. 2 shows a nonlinear encoding characteristic 60. Assume that it is desired to approximate this nonlinear function by using a piecewise-linear characteristic having two breakpoints per quadrant, as shown in FIG. 2. In accordance with the invention, these breakpoints are chosen to occur at predetermined transitions in the permutation of the binary code.

Consider for example, the first quadrant of the plot. Breakpoint 62 is chosen to occur at the transition of the second most significant digit from "1" to "0," so that the segment 64 has a "scale factor" of 4. The "scale factor" of a segment is here defined as the slope thereof—a ratio of code value to analog value. It is to be distinguished from the "compression ratio" of a continuously nonlinear characteristic. The latter ratio is defined as the ratio of the slope of the nonlinear characteristic at the origin thereof to the slope of the corresponding linear characteristic passing through the origin.

Segments 66 and 68, therefore, have scale factors of 1 and ⅓, respectively. There is a marked reduction in scale factor as one progresses from the origin of the plot to the maximum message current excursion $i_{max}$. The reduction is due to the fact that the dynamic range of $i_s$ is compressed. In the encoding process, the lower values of $i_s$ are greatly emphasized. For example, 1.0 unit of message current amplitude is transmitted as the code group 0011 $(+2^2+0+0)$, which has a code value of 4.0 units. The higher values of $i_s$, on the other hand, are de-emphasized. Thus, for example, a message current value of 4.0 units is transmitted as the code group 0001 $(+2^2+2^1+0)$, which has a code value of 6.0 units.

It will be noted that the most significant digit of the code—the order of significance decreasing from left to right—is the polarity digit. Where the bit "0" appears as the most significant digit, it is immediately understood that the sample of message current $i_s$, which is being encoded, is of positive polarity. Where, on the other hand, the bit "1" occupies the most significant position in the code group, the polarity is understood to be negative. The reader will note that the function of the bits "1" and "0" for positive code groups is opposite to that for negative groups. Thus, for positive values the bit "0" informs the recipient circuit thereof that the base two is to be taken to some power, depending upon the significance of the digit, whereas the bit "1" is zero-valued. For negative values, on the other hand, the bit "1" is assigned numerical significance and the bit "0" is zero-valued. For example, the code group 0011 should be interpreted to mean $(+2^2+0+0)$, while 1100 should be read $$(-2^2-0-0)$$

The significance of the bits, as used here, is merely illustrative. Many variations in the significance which may be assigned to bits are known, and it is only necessary that the system be arranged to recognize the meaning attached.

Figure 2:
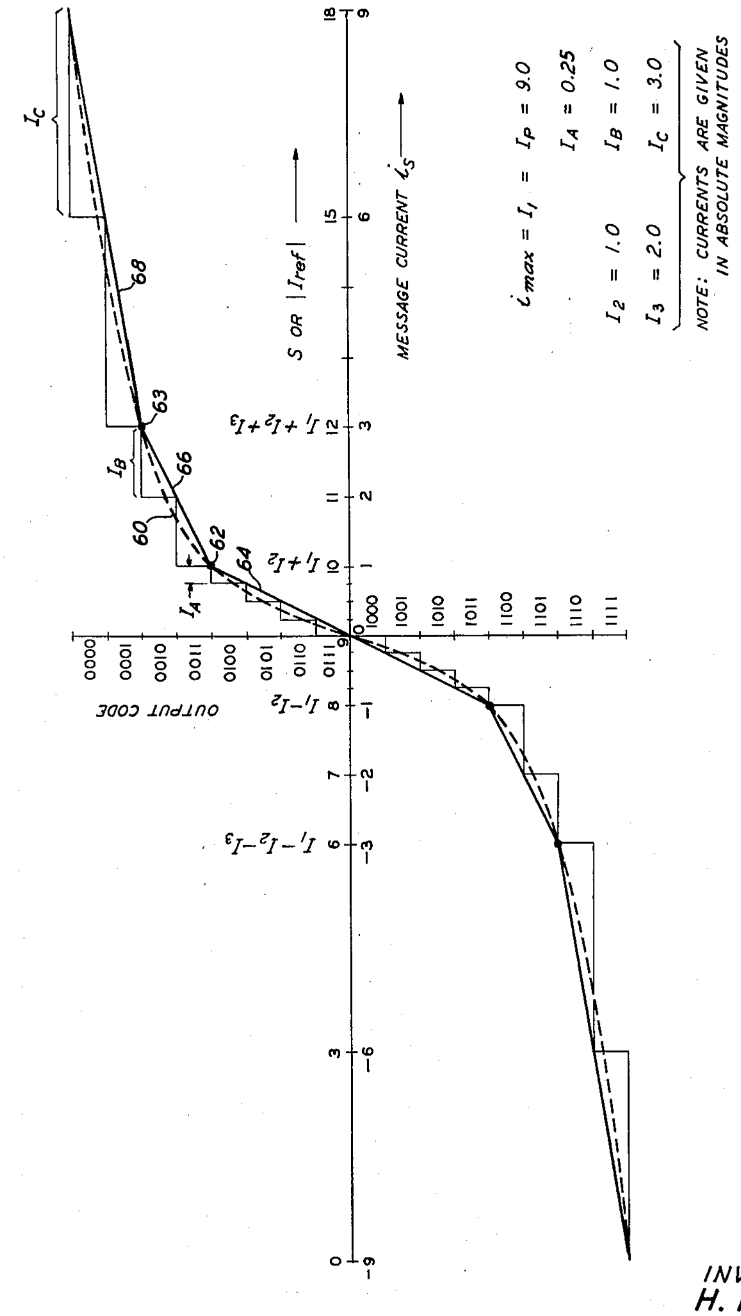
FIG. 2 is a plot of the encoding characteristic of the encoder of FIG. 1.

Numerical examples will be used to describe the operation of FIG. 1. Accordingly, illustrative numerical values have been given the various currents which will be encountered. It can be seen in FIG. 2 that the current S is equal to the sum of $I_p$, the pedestal current, and $i_s$, which has been limited to a maximum excursion of 9.0 units in either the positive or negative directions. The pedestal current $I_p$ has also been given a value of 9.0 units. The current S will therefore always be zero or positive. Accordingly, there is need for reference current of negative polarity only. Entered above the abscissa of FIG. 2 are values of the current S and absolute values of $I_{ref}$. Entered beneath the abscissa are corresponding values of the message current $i_s$.

The portion of the abscissa encompassed by the segment 64 is divided into four subsections, each equal to a quantum of current $I_A$. The portion of the abscissa encompassed by the segment 66 is divided into two subsections, each equal to a quantum of current $I_B$. Segment 68 encompasses the final positive portion of the abscissa, which portion is also divided into two subsections, each equal to a quantum of current $I_C$. Because of the choice of breakpoints, the subordinate reference current $I_A$, $I_B$, and $I_C$ have the following relationship: $I_C{:}I_B{:}I_A=12{:}3{:}1$.

Figure 3:
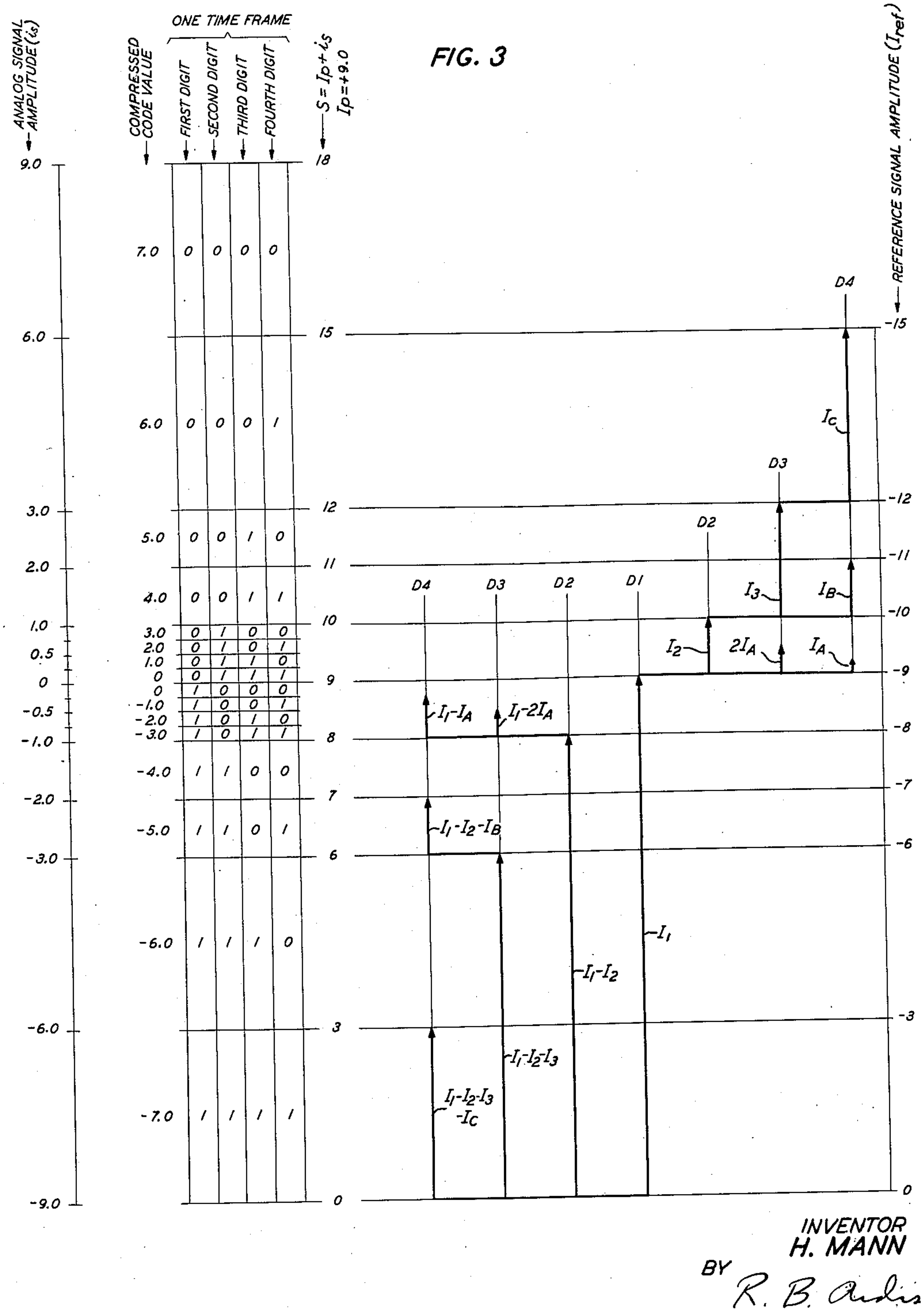
FIG. 3 is a so-called encoding flow diagram which illustrates the operation of the circuit of FIG. 1.

The approximation process of the illustrative encoder of FIG. 1 is shown in the right-hand portion of FIG. 3, which is a so-called encoding flow diagram. The encoding steps which may be taken at times D1–D4 are plotted between vertical axes, one of which represents the current S and the other, the reference current $I_{ref}$. Times D1–D4 correspond to the timing impulses generated by timing wave source 32 of FIG. 1. The pedestal current $I_p$, as mentioned above, renders the current S greater than or equal to zero. Only negative reference current need therefore be generated. The diagram is self-explanatory.

At time D1 the reference current $I_1$ is generated, in a manner which will be explained, and compared at a summing node (juncture 54 of FIG. 1) with the current S to determine the polarity of $i_s$. If the summation yields a negative current, the encoder immediately recognizes that the message current $i_s$ is of negative polarity. Conversely, if the sum is positive, it is understood that the polarity of $i_s$ is also positive. To be more specific, if $I_1+S>0$, then at time D2 the current $I_2$ will be added to $I_1$. If, however, $I_1+S<0$, then generation of the current $I_1$ will cease at time D2 and the current $I_1-I_2$ will be compared with S. The process then proceeds as indicated.

The amplitude of message current $i_s$ is plotted opposite its corresponding code value in the left-hand portion of FIG. 3. The compression of the dynamic range of $i_s$ is apparent. The simple, four-digit code used to illustrate the invention is accommodated by periodically recurrent time slots corresponding in number to the digits of the code. These time slots commence at times D1, D2, D3, D4, which times correspond, as mentioned above, symbolically to the terminals of timing wave source 32 of FIG. 1. The "clearing-out" or reset time slot, slot number 5, is not shown in FIG. 3. It will be explained in connection with FIG. 1.

The resistors $R_1$ to $R_4$, $R_3'$, $R_4'$, $R_9$ and $R_{10}$ of FIG. 1 are intimately associated with the generation of the various components of the reference current shown in FIGS. 2 and 3. The values of these resistors are determined by the currents they must supply from the reference current sources $E_1$ and $E_2$ to the summing node 54. The immediately following discussion is best read in conjunction with the right-hand portion of FIG. 3.

The component $I_1$ is generated by connecting only resistors $R_1$ and $R_9$ to $E_1$, and only resistor $R_{10}$ to $E_2$. When resistor $R_1$ is disconnected from $E_1$ in the above combination, the current $I_1-I_2$ is generated. The current $I_1-2I_A$ is generated by connecting only resistors $R_3$ and $R_9$ to $E_1$ and only resistor $R_{10}$ to $E_2$. When, in addition, resistor $R_4$ is connected to $E_1$, the current $I_1-I_A$ is generated. If the current $I_1-I_2-I_3$ is to be generated, only resistor $R_{10}$ will supply current to summing node 54. Generation of the current $I_1-I_2-I_B$ is accomplished by supplying current from $E_1$ only by way of the parallel combination of $R_4$ and $R_4'$ and from $E_2$ only by way of $R_{10}$. When the current $I_1-I_2-I_3-I_C$ (or, simply, $I_C$) is to be generated, current is supplied only by $E_2$ and only by way of the parallel combination of $R_4$ and $R_4'$.

To generate the current $I_1+I_2$, only resistors $R_1$, $R_2$ and $R_9$ are connected to $E_1$ and only $R_{10}$ is connected to $E_2$. The current $I_1+2I_A$ is generated by connecting only resistors $R_1$, $R_3$ and $R_9$ to $E_1$ and only $R_{10}$ to $E_2$. When the current $I_1+I_A$ is to be generated only resistors $R_1$, $R_4$ and $R_9$ are connected to $E_1$ and only $R_{10}$ is connected to $E_2$. The current $I_1+I_2+I_3$ is generated by connecting only resistors $R_1$ to $R_3$, $R_3'$ and $R_9$ to $E_1$ and only resistor $R_{10}$ to $E_2$. To generate the current $I_1+I_2+I_B$ only the following connections are made: $R_1$, $R_2$, $R_4$, $R_4'$ and $R_9$ are connected to $E_1$ and $R_{10}$ is connected to $E_2$. Finally, the generation of the current $I_1+I_2+I_3+I_C$ requires that resistors $R_1$ to $R_3$, $R_3'$ and $R_9$ be connected to $E_1$ and that resistors $R_4$, $R_4'$ and $R_{10}$ be connected to $E_2$.

A switch is associated with each of the above-named resistors. At appropriate times each of these switches will connect an associated resistor serially to reference current source $E_1$ or $E_2$. The switches will have an impedance, however small it may be. When, therefore, the values of the resistors named above are to be chosen in accordance with the currents they are to convey, due regard should be given the impedance of their associated switches. For all practical purposes, the switches may be deemed constant resistances, merely serving to decrease the current supplied to the summing node 54 and having no effect on the binary relationship between the various reference currents generated.

Because they are negligible, and to avoid undue complication, the switch impedances will be ignored in the relationships to be given. For the illustrative embodiment chosen to describe the invention, the resistors will bear the following relationship to each other.

$$R_4:R_3:R_2=4:2:1$$
$$R_9:R_1=2:1=R_4':R_3'$$
$$R_1=R_2;\ R_9=R_{10}$$
$$R_8=\frac{R_3'R_4'}{R_3'+R_4'}$$

That $R_8$ has a value equal to that of the parallel combination of $R_3'$ and $R_4'$ is apparent from the equation immediately above. In accordance with the invention and as previously mentioned, the switch S8, operating in logical response to determinations of previously occurring summing processes, renders the impedance Z constant at all times. But for switch S8, variations in the impedance Z would occur whenever $R_3'$ and $R_4'$ were connected to the summing node 54. Switch S8 ordinarily connects $R_8$ to the summing node 54. When, however, switch S12 switches $R_3'$ and $R_4'$ into connection with the node, switch S8 simultaneously removes $R_8$ therefrom. The impedance Z is therefore rendered constant.

The illustrative embodiment of FIG. 1 simultaneously performs the processes of encoding and compression. The processes are accomplished on a piecewise-linear basis, as has been mentioned above. Before going through the encoding process, which will be described using representative hypothetical examples, it will be helpful to describe the nature of the various elements in the circuit. The flip-flop circuits $FF_1$ to $FF_4$ may each be of the conventional Eccles-Jordan type. They are each bistable in nature, being switched from one state to the other by an impulse supplied to either of the input terminals $s$ and $r$, and remaining in the state determined by the impulsed terminal until such time as the other terminal is impulsed.

Binary terminology will be used to denote the states of the various terminals and junction points of the circuit. Thus, for example, when the output terminal $y$ of flip-flop $FF_2$ is in an enabling state, that is, in a state such that it will enable its associated switch, switch S2, it will be said that the terminal $y$ is in the "1" state. For convenience of narration, the following terminology will be used to distinguish the input terminals of the various flip-flops. For example, rather than say "the input terminal $s$ of flip-flop circuit $FF_2$", the symbol $s$ ($FF_2$) will signify this association.

When the terminal $s$ of any of the flip-flop circuits is impulsed, the unprimed (e.g., $x$) and primed (e.g., $x'$) output terminals will be respectively in the "1" and "0" states. For example, an impulse supplied to the terminal $s$ ($FF_1$) will cause the states of terminals $x$ and $x'$ to be respectively "1" and "0." Impulsing of an $r$ terminal, on the other hand, will cause its associated unprimed and primed terminals to be respectively in the "0" and "1" states. Impulsing of the $r$ terminal of a flip-flop circuit is the manner by which the circuit is reset, and occurs whenever its associated AND gate or the reset bus 22 is enabled. When any of the switch-controlling output terminals of the flip-flops $FF_1$ to $FF_4$, viz., the terminals $x$, $y$, $z$ and $w$, is in the "1" state, its associated switch will be enabled and switched to its reference current terminal. Thus, for example, when the terminal $x$ is in the "1" state, state, the switch S1 will be switched to the reference current bus 24, thereby connecting the resistor $R_1$ to the reference current source $E_1$.

The switches S2 and S3 deserve special mention in view of their respective inhibit terminals 26 and 28. When the terminal $x'$ is in the "1" state, which it is whenever $FF_1$ is reset, an impulse is supplied to the inhibit terminal 26. This will ensure that switch S2 connects resistor $R_2$ to ground regardless of the state of terminal $y$. When the terminals $x'$ and $y'$ are concurrently in the "1" state, AND gate 30 supplies an impulse to the inhibit terminal 28. Switch S3 cannot then be connected to the reference current source $E_1$ by way of bus 24.

The AND and OR gates of FIG. 1 are shown in a convention now widely used. Note that in this convention an OR gate is distinguishable from an AND gate in that the inputs of the former extend perpendicularly through the chord of the arc to the arc, whereas the inputs of the AND gate extend no further than the chord itself. It is understood, of course, that an AND gate is not enabled unless stimuli are supplied simultaneously to all of its inputs. The OR gate, on the other hand, is enabled when a stimulus is supplied to any of its inputs.

The timing wave source 32 supplies impulses to various points in the circuit at periodically recurring instants of time. There exist in the prior art many timing wave sources suitable for use in FIG. 1. Timing wave source 32 may, for example, be the "Timed-Signal Generator," disclosed in volume 32 of the McGraw-Hill publication, Electronics, at page 52 (March 6, 1959).

The summing amplifier 34 reverses the phase of its input current $i_{in}$. Its output current $i_{out}$ is regenerated by the regenerator 36, which is timed by the timing wave source 32. Timing impulses are supplied to the regenerator timing input 38 periodically by each of the output terminals D1 to D4 of timing wave source 32. Whenever the current $i_{out}$ is positive and there is a concurrence of a timing impulse, the regenerator 36 will fire, supplying an impulse to the PCM output terminal 56 and to the delay circuit 40. The delay circuit 40 provides a delay interval of approximately one time slot so that the input of AND gate 42, for example, which is connected to the delay circuit 40, will be enabled approximately one time slot after the regenerator 36 has fired.

The operation of the circuit of FIG. 1 will now be described by using hypothetical numerical examples.

As a first example, let it be assumed that the input signal $i_s$ is positive and has a value of 4.0 units of analog signal amplitude. It will be seen from a perusal of FIG. 2 that this value of $i_s$ utimately will cause the encoder of FIG. 1 to generate the code group 0001.

At the commencement of the first time slot of the code group to be generated, the terminal D1 of timing wave source 32 supplies an impulse to the terminal $s$ ($FF_1$) causing the terminals $x$ and $x'$ to be respectively in the "1" and "0" states. Terminal $x$ will therefore enable the switch S1 which, in turn, switches resistor $R_1$ from ground to the $E_1$ reference current bus 24.

It should be noted that immediately before the commencement of any code group the unprimed and primed terminals of the flip-flop circuits $FF_1$ to $FF_4$ are respectively in the "0" and "1" states. This is accomplished by terminal D5 of timing source 32 which impulses the reset bus 22 during the interval between the last time slot of each code group and the first time slot of the next succeeding group. Accordingly, at this time (time slot 1 of the time frame now under consideration), the terminals $y$, $z$, and $w$ are all in the "0" state and their respective switches S2, S3 and S4 are all disabled, i.e. connected to ground.

We have seen that the states of the terminals $x(FF_1)$ and $x'(FF_1)$ are made respectively "1" and "0" during the first time slot. Accordingly, the functions $xyz$ (meaning the multiplication of the states of $x$, $y$, and $z$) and $x'y'z'$ are both equal to zero. The switch S11, is in its disabled condition when no enabling potential is received from the OR gate 80 and connected to the reference current source $E_1$, as shown. It will be noted that in order for switch S11 to be enabled, the OR gate 80 must first be enabled, which means that one of the functions $xyz$ and $x'y'z'$ must be equal to one.

OR gate 48 is enabled when any of the terminals $x$, $y$ or $z$ is in the "1" state. Since terminal $x$ is now in the "1" state, OR gate 48 is enabled and in turn enables switch S10. The resistor $R_{10}$ is switched from ground to the reference current source $E_2$.

In view of the fact that terminal $x$ is in the "1" state, the OR gate 49 is enabled, thereby enabling switch S9 and connecting resistor $R_9$ to the reference current source $E_1$.

The switch S8 is unaffected since neither the function $x'y'$ nor the function $xy$ is equal to one. Accordingly the resistor $R_8$ remains connected to the reference current bus 50. As was previously mentioned, it is the switch S8, operating in response to its associated logic circuitry, that renders the impedance Z constant throughout the encoding operation.

Switch S12 is enabled only when the function $x'y'$ or the function $xy$ is equal to one and, therefore, at this time it is disabled, connecting the resistors $R_3'$ and $R_4'$ to its open circuit terminal.

Summing up the conditions manifest in the circuit at time slot one, we note that the resistors $R_1$ and $R_9$ are connected to the reference current source $E_1$, and the resistor $R_{10}$ is connected to the reference current source $E_2$. All other resistors are denied reference current at this time. Accordingly, during time slot 1, the reference current $$I_{ref}=\frac{E_1}{R_1}+\frac{E_1}{R_9}+\frac{E_2}{R_{10}}=I_1$$

is supplied to summing node 54.

The pedestal current $I_p$ and the current $I_1$ are equal to each other in absolute magnitude and, also, are equal to one-half the maximum peak-to-peak excursion of the message current $i_s$. This was explained in connection with FIG. 2 where $I_1$ and $I_p$ occur at the origin of the plot. The message current $i_s$ and the pedestal current $I_p$ are combined at junction 52 to yield the current S. The current S and the reference current $I_{ref}$ in turn are combined at the summing node 54 to yield the current $i_{in}$. Since the current $i_s$ is here assumed to have a value of +4.0 units of analog signal amplitude and the pedestal current $I_p$ (equal in absolute magnitude to the current $I_1$) has a value of 9.0 units, as can be seen in either FIG. 2 or FIG. 3, the current S has a value of +13 units. When, therefore, current S is combined with the reference current $I_{ref}$ at the summing node 54, it can be seen that the current $i_{in}$ will be equal to +4.0 units, since the reference current $I_{ref}$ ($I_{ref}=I_1=-9.0$) and the pedestal current $I_p$ cancel out. The summing amplifier 34 reverses the phase of the current $i_{in}$ so that the current $i_{out}$ is negative 4.0 units. The regenerator 36 is therefore unaffected since it will regenerate signals supplied to its input only when they are positive. The first digit of the instant code group is therefore a "0" which, as has been mentioned above, indicates that the message current $i_s$ is positive. This "0" binary condition is manifest at the output terminal 56.

Since $i_s$ is now known to be positive, the encoding flow diagram, occupying the right-hand portion of FIG. 3, calls for the reference current $I_1+I_2$ at this time. At the commencement of the second time slot, the terminal D2 of timing wave source 32 supplies an impulse to the terminal $s(FF_2)$, thereby rendering the states of the terminals $y$ and $y'$ respectively "1" and "0." None of the AND gates 42, 44 or 46 can be enabled at the commencement of time slot 2 since there is no impulse on the bus 58 at this time. Accordingly, the terminal $x'$ remains in the "0" state and the inhibit terminal 26 of switch S2 remains disabled. Since the terminal $y$ is now in the "1" state, and the inhibit terminal 26 is no bar to the activation of switch S2, the switch S2 will be enabled connecting the resistor $R_2$ to the $E_1$ reference current bus 24. The connections of all the other resistors with the exception of $R_3'$ and $R_4'$, remain as they were during time slot 1. Reference current now flows through the resistor $R_2$ from the source $E_1$ to the reference current bus 50. The value of the resistor $R_2$ is chosen, as previously mentioned, so that the current $I_2$ flows through it at this time. Consulting FIG. 2, the reader will note that the value of current $I_2$ is 1.0.

At this stage of the discussion it should be re-emphasized that the numerical values of current shown in FIGS. 2 and 3, and used throughout the description of the embodiment of FIG. 1, are merely illustrative. So, too, the piecewise-linear characteristic of FIG. 2 is merely illustrative and may be varied in accordance with the invention to approximate any desired nonlinear characteristic.

The functions $xyz$ and $x'y'z'$ remain equal to zero during time slot 2 so that the switch S11 remains connected to the reference current $E_1$. The function $xy$, however, is equal to 1 at this time and consequently the switch S12 connects the resistors $R_3'$ and $R_4'$ to the reference current bus 50. Simultaneously, the switch S8 connects the resistor $R_8$ to the open circuit terminal of switch S8, thereby disconnecting the resistor $R_8$ from the reference current bus 50. Thus, even though the resistors $R_3'$ and $R_4'$ are connected to the summing node 54, the impedance Z remains unaffected because the resistor $R_8$, which is equal in magnitude to the sum of resistors $R_3'$ and $R_4'$ has been disconnected from node 54. The switch S8 therefore serves to keep the impedance Z constant.

It will be noticed that the connection of the resistors $R_3'$ and $R_4'$ to the reference current bus 50 does not affect the magnitude of the reference current $I_{ref}$ since these resistors are connected to ground by the switches S3 and S4, respectively. As was previously mentioned, the current $I_1$ continues to flow into the summing node 54 by way of resistors $R_1$, $R_9$ and $R_{10}$. Resistor $R_9$ remains connected to reference current source $E_1$ because both of the terminals $x$ and $y$ are in the "1" state, thus enabling OR gate 49 and in turn enabling the switch S9. It can be seen that the switch S10 also remains enabled.

To sum up the preceding operations during time slot 2 of frame 1, the current $I_1$ is supplied by way of resistors $R_1$, $R_9$ and $R_{10}$ and the current $I_2$ is supplied by way of the resistor $R_2$. No current is supplied via the other resistors in the circuit. Therefore, at this time, the reference current supplied to the summing node 54 is $$I_{ref}=E_1\left(\frac{1}{R_1}+\frac{1}{R_9}+\frac{1}{R_2}\right)+\frac{E_2}{R_{10}}=I_1+I_2$$

It can be seen from a consideration of FIG. 2 that in numerical units the current $I_{ref}$ is therefore equal to negative 10.0 units. Since the current S is equal to +13.0 units: the current $i_{in}$ is therefore now equal to +3.0 units, the current $i_{out}$ is negative, in view of the phase reversal occurring in amplifier 34, and the second most significant digit appearing at the output terminal 56 is a "zero." The accumulated code output at the end of time slot 2 is therefore 00.

At the completion of time slot 2 it was determined that the net current resulting from the summation of $I_{ref}$ and S was still positive. Consulting the encoding flow diagram of FIG. 3, the reader will note that this determination now (at time D3) calls for the addition of $I_3$ to $I_1+I_2$. As will be seen, the current $I_3$ will be supplied by way of the parallel combination of resistors $R_3$ and $R_3'$. Since the current $I_1+I_2$ is to be retained, the resistors $R_1$, $R_2$, $R_9$, and $R_{10}$ will remain connected to their respective sources, as they were during time slot 2. None of the other resistors will be used to supply reference current at this time.

The circuit operations which will produce the current $I_1+I_2+I_3$ will now be described. At the commencement of time slot 3 an impulse from the terminal D2 of timing wave source 32 is supplied to the terminal $s(FF_3)$. Since the inhibit terminal 28 of switch S3 is inoperative at this time ($x'y'=0$), switch S3 will be enabled by the terminal $z$. Consequently, the resistors $R_3$ and $R_3'$ will be connected to the $E_1$ reference current source. Since the function $xy$ is equal to one at this time, the switches S8 and S12 will remain activated, as they were during time slot 2. Accordingly, the resistors $R_3$ and $R_3'$ remain connected to, and the resistor $R_8$ remains disconnected from, the reference current bus 50. The current $I_3$ is therefore supplied from the source $E_1$ by way of reference current bus 24, switch S3, and the resistors $R_3$ and $R_3'$ to the summing node 54.

Since the function $xyz$ is now equal to the one, the switch S11 will be activated, switching the reference current bus 70 from the source $E_1$ to the source $E_2$. No current is supplied by way of resistors $R_4$ and $R_4'$ to the summing node 54, however, since the switch S4 is connected to ground at this time. Hence, the total reference current supplied to summing node 54 is $$E_1\left(\frac{1}{R_1}+\frac{1}{R_2}+\frac{1}{R_3}+\frac{1}{R_3'}+\frac{1}{R_9}\right)+\frac{E_2}{R_{10}}=I_1+I_2+I_3$$

As can be seen in either FIG. 2 or FIG. 3, the current $I_3$ is, by way of example, equal to 2.0 units. $I_{ref}$, now consisting of $I_1$, $I_2$ and $I_3$, is therefore, equal to 12.0 units. It should be mentioned again that the polarity of all the various reference current components is negative. With this in mind, no confusion will result when $I_{ref}$ is given in absolute units of magnitude. When, therefore, the reference current $I_{ref}$ is combined with the current S at summing node 54, the net resultant current, $i_{in}$, is equal to +1.0 unit. Since a phase reversal occurs in summing amplifier 34, the current $i_{out}$ is negative, the regenerator 36 will not fire, and the third most significant digit appearing at the PCM output terminal 56 is a "0." The accumulated code output at the end of time slot 3 is therefore 000.

Consulting FIG. 2, the reader will note that the operation of the encoder has now progressed through the regions encompassed by segments 64 and 66. The regions wherein the current steps $I_A$ and $I_B$ delineate subregions of $I_2$ and $I_3$, respectively, did not have to be explored, since addition of the currents $I_2$ and $I_3$ to the current $I_1$ was found to be still insufficient to render the current $i_{in}$ negative. Accordingly, from a perusal of FIG. 3, it can be seen that the next and final step will be to add the current step $I_C$ to the currents so far generated. It will be seen that the current $I_C$ will be produced by connecting the resistors $R_4$ and $R_4'$ to the reference current source $E_2$.

It should be noted that in the illustrative embodiment of FIG. 1, the reference current source $E_2$ has, by way of example, a potential three times that of reference current source $E_1$. The source $E_2$ may be dispensed with, however, if it is found preferable to accomplish a corresponding change in reference current by, for example, changing the value of $R_{10}$. Thus, current supplied from $E_1$ through a resistor one-third the magnitude of $R_{10}$ would be equivalent to the current supplied from $E_2$ through $R_{10}$.

At the commencement of time slot 4 the terminal D4 of timing wave source 32 supplies an impulse to the terminal $s(FF_4)$. This causes the flip flop circuit $FF_4$ to change state and, consequently, to enable the switch S4, switching it from ground to the reference current bus 70. It will be recalled that bus 70 was switched from $E_1$ to $E_2$ during time slot 3. Accordingly, the current $I_C$ is now supplied by way of resistors $R_4$ and $R_4'$ through the switch S12 to the summing node 54. All the other resistors in the circuit remain connected as they were during time slot 3. The reference current supplied to the summing node 54 during time slot 4 is therefore $$E_1\left(\frac{1}{R_1}+\frac{1}{R_2}+\frac{1}{R_3}+\frac{1}{R_3'}+\frac{1}{R_9}\right)+E_2\left(\frac{1}{R_{10}}+\frac{1}{R_4}+\frac{1}{R_4'}\right)=I_1+I_2+I_3+I_C$$

Consulting FIG. 2 or FIG. 3, the reader will note that an illustrative numerical value of 15.0 units has been assigned the above combination of currents. It can be seen, therefore, that when the current $I_{ref}$ is combined with the current S at the summing node 54, the current $i_{in}$ will have a value of negative 2.0 units and the current $i_{out}$ will be positive. The regenerator 36 will therefore fire, causing the digit "1" to appear at the PCM output terminal 56. The time frame is now complete and the accumulated code is 0001.

As the second and final example, let it be assumed that the input signal $i_s$ is negative and has a magnitude of 0.4. It can be seen in FIG. 2 that this value of $i_s$ will ultimately cause the encoder of FIG. 1 to generate the code group 1001. At the commencement of time slot 1, the terminal D1 of timing wave source 32 supplies an impulse to the terminal $s(FF_1)$ causing $FF_1$ to change state. The terminal $x$, now being in the "1" state, enables the switch S1, which, in turn, connects the resistor $R_1$ to the reference current source $E_1$. OR gate 49 is enabled and the resistor $R_9$ also is connected to the source $E_1$. Finally, OR gate 48 is enabled and the resistor $R_{10}$ is connected to the source $E_2$.

As was previously mentioned, the connection of the resistors $R_1$, $R_9$, and $R_{10}$ to the sources named results in the generation of the current $I_1$. All other resistors in the circuit remain inactive at this time. Since it has been assumed that the current $i_s$ is presently equal to $-0.4$, the current S is equal to $+8.6$. The combination of S and $I_{ref}$ at the summing node 54 therefore results in a value of $i_{in}$ equal to $-0.4$. The summing amplifier 34 reverses the phase of $i_{in}$ so that the current $i_{out}$ is positive, regenerator 36 is fired, and the most significant digit supplied to the PCM output terminal 56 is consequently a "1." As was previously mentioned, a most significant digit of "1" indicates that the message current $i_s$ is negative.

The impulse supplied to the PCM output terminal 56 by regenerator 36 is also supplied to delay circuit 40 which, it will be recalled, provides a time delay of approximately one time slot. At the commencement of time slot 2, then it can be seen that the terminal $r(FF_1)$ will be impulsed by the AND gate 42. The flip-flop circuit $FF_1$ will accordingly be reset and switch S1 will connect resistor $R_1$ to ground. The impulse from the terminal D2 of timing wave source 32, which concurred with the impulse supplied by delay circuit 40 to enable AND gate 42, also changes the state of flip-flop circuit $FF_2$. Though the terminal $y$ is now in the "1" state and would ordinarily activate the switch S2, the terminal $x'$ is also now in the "1" state and, therefore, switch S2 is inhibited by its inhibit terminal 26. Consequently, at this time the only resistors passing current to the summing node 54 are the resistors $R_9$ and $R_{10}$, the former being connected to $E_1$ and the latter being connected to $E_2$. Resistors $R_9$ and $R_{10}$ convey the current $I_1-I_2$ to the summing node 54. All other resistors in the circuit are inactive at this time.

Consulting FIG. 2, the reader will note that the current $I_1-I_2$ has an illustrative absolute magnitude of 8.0 units. When, therefore, this current is combined with the current S at summing node 54, the resultant value of $i_{in}$ will be $+0.6$. The current $i_{out}$ will therefore be negative, regenerator 36 will not fire, and the second most significant digit supplied to the PCM output terminal 56 will be the digit "0." The accumulated code at this time is, therefore, 10.

At the commencement of time slot 3, an impulse is supplied to the terminal $s(FF_3)$ by the terminal D3 of timing wave source 32. Flip-flop circuit $FF_3$ thereupon changes state so that the state of the terminal $z$ is now a "1." Since the terminal $y'$ is in the "0" state at this time, the function $x'y'$ is equal to 0 and switch S3 is not inhibited by its inhibit terminal 28. Therefore, switch S3 connects the resistors $R_3$ and $R_3'$ to the reference current source $E_1$; but in view of the fact that the switch S12 remains connected to its open circuit terminal, current is conveyed by way of the reference current bus 24 only through the resistor $R_3$. This current ($2I_A$) has, by way of example, an absolute magnitude of 0.5. The only resistors conducting current at this time are $R_3$, $R_9$ and $R_{10}$. Since the resistors $R_9$ and $R_{10}$ supply the current $I_1-I_2$ and the resistors $R_3$ supplies the current $2I_A$, the current supplied to the summing node 54 at this time is $I_1-I_2+2I_A$ (or $I_1-2I_A$, as shown in FIG. 3) which has an absolute magnitude of 8.5. When, therefore, this current is combined with the current S at the summing node 54, the resultant current $i_{in}$ has a value of $+0.1$. Because $i_{out}$ is now negative, regenerator 36 will not be fired and the third most significant digit appearing at the output terminal 56 is a "0." The accumulated code at this time is 100.

At the commencement of time slot 4 an impulse, supplied to the terminal $s(FF_4)$ by the terminal D4 of timing wave source 32, causes the terminal $w$ to assume the "1" state. Switch S4 is enabled, connecting the resistors $R_4$ and $R_4'$ to the reference current bus 70. Neither $xyz$ nor $x'y'z'$ is equal to one at this time. Consequently, switch S11 remains disabled and reference current bus 70 is connected to the source $E_1$. Also, since the functions $x'y'$ and $xy$ are both equal to zero, the switch S12 is connected to its open circuit terminal, as shown. The reference current bus 70 therefore supplies current from the source $E_1$ only by way of the resistor $R_4$. The current supplied is the current $I_A$, which, as can be seen, has an absolute magnitude of 0.25. The only resistors conducting current to the summing node 54 at this time are the resistors $R_3$, $R_4$, $R_9$ and $R_{10}$. The total current supplied is $I_1-I_2+3I_A$ (or $I_1-I_A$, as shown in FIG. 3) which has an absolute magnitude of 8.75. When this current is combined with the current S at the summing node 54, the resultant current $i_{in}$ has a value of $-0.15$. The current $i_{out}$ is therefore positive and causes the regenerator 36 to fire in concurrence with the timing impulse supplied by terminal D4 of timing wave source 32. The final digit supplied to the output terminal 56 is therefore a "1" and the completed code group, as predicted, is 1001.

In the foregoing description, the invention has been illustrated by apparatus for converting analog information to a binary code. The invention may be extended in a straightforward manner to apparatus for translating to or from a permutation code of any base $b$. Thus, for example, in the case of the ternary code in which the base is 3 and each digit position may contain a pulse having any one of three coefficient values, viz., 0, 1 or 2, the binarily related resistors in the circuit of FIG. 1 could be reproportioned so that the various sums of any number of them taken in succession from a reference value would be proportional to the successive integral powers of 3. It should be understood, therefore, that the above described arrangements are illustrative of the application of the principles of the invention. Without departing from the spirit and scope thereof, other arrangements may be devised by those skilled in the art.

What is claimed is:

1. An encoder to transform amplitude samples of current to a binary code, nonlinearly on a piecewise-linear basis, comprising means to establish a relation between said code and said current samples defining a piecewise-linear characteristic consisting of a plurality of segments and at least one breakpoint per quadrant; means to generate currents defining and extending to each breakpoint of said characteristic; means to encode said amplitude samples linearly within each segmental range of the current axis of said piecewise-linear characteristic, including a summing node, a reference current network to supply reference currents to said node, and means to supply said amplitude samples to said node for comparison with said reference currents, means to change said relation between said amplitude samples and said code only as the operation of the encoder proceeds from one segmental range to another; and means, ultimately responsive to said comparisons, to render the load-to-ground impedance of said summing node constant during the transformation of said samples to said code.

2. An encoder in accordance with claim 1 in which said means to render the load-to-ground impedance of said node constant comprises switching means and impedance means, ordinarily connected to said summing node by said switching means, and, responsive to said comparisons, connected to an open circuit point by said switching means.

3. An encoder in accordance with claim 1 in which said means to change said relation comprises a plurality of reference current sources having potentials of different magnitude; and in which said reference current network comprises a plurality of resistors related as the powers of two, and a plurality of switches operating in response to said comparisons for connecting predetermined ones of said resistors to said reference current sources in order to supply reference currents of predetermined magnitudes to said summing node.

4. An encoder to transform amplitude samples of current of prescribed maximum peak-to-peak excursion to a binary code, nonlinearly on a piecewise-linear basis, comprising means to establish a relation between said code and said current samples defining a piecewise-linear characteristic consisting of a plurality of segments and at least one breakpoint per quadrant; means to superimpose said amplitude samples on a pedestal current substantially equal to one-half said maximum peak-to-peak amplitude sample excursion; a reference current network for generating breakpoint-determining reference currents and subordinate reference currents for comparison with said amplitude samples, said subordinate currents binarily dividing the analog current axis traversed by their respective breakpoint-determining currents; a summing node for accomplishing said comparisons; means responsive to said comparisons for controlling the generation of said reference currents and for converting the results of said comparisons to elements of the binary code; means for supplying said reference, amplitude sample, and pedestal currents to said summing node; and means, also responsive to said comparisons, for rendering the load-to-ground impedance of said summing network constant throughout the analog-to-digital transformation process.

5. An encoder in accordance with claim 4 in which said means to convert the results of said comparisons to elements of the binary code comprises pulse regenerator means.

6. An encoder in accordance with claim 4 in which said means to render the load-to-ground impedance of said summing node constant comprises impedance means and switching means connecting and disconnecting said impedance means from said node in logical response to said comparisons.

7. An encoder in accordance with claim 4 in which said means to supply said reference current to said summing node includes means to first supply thereto a reference current equal to one-half said maximum peak-to-peak excursion of said amplitude samples.

8. Apparatus for converting incoming amplitude samples supplied to its input into binary code groups of two-valued pulses arranged in accordance with the binary code at its output, each such code group representing an associated one of said amplitude samples and each pulse of each code group representing a portion of the amplitude of its associated sample, comprising a pair of reference potential sources; a plurality of resistors having ohmic values related as the powers of two and connected in parallel between respective ones of said pair of reference potential sources and said apparatus input; a plurality of switches associated with said network resistors to connect said associated resistors to ground when disabled and to one of said sources of reference potential when enabled; a plurality of bistable circuits each having a timing input and an "AND" gate input and each associated with an individual one of said plurality of switches to enable its associated switch in one state and to disable said associated switch in its other state; a plurality of "AND" gates each interconnecting said output of said apparatus and an individual one of said bistable circuits and each having a pair of inputs and an output, one of said "AND" gate inputs being connected to said apparatus output and the other of said "AND" gate inputs being connected to the timing input of one of said bistable circuits, said "AND" gate output being connected to the "AND" gate input of the bistable circuit whose state is changed via its timing input next preceding a change of state of said one of said bistable circuits to which said other of said "AND" inputs is connected; said apparatus comprising two parallel branches interconnecting said input and said output, one of said branches including, in the order of connection from said apparatus input, said network resistors, said switches, said bistable circuits, said "AND" gates, and a delay circuit having a delay equal to one pulse interval in said pulse groups; and the other of said branches including, in the order of connection from said input of said apparatus, a summing amplifier and a regenerative amplifier; timing means connected to said bistable circuit timing inputs recurrently to change the state of each of said bistable circuits individually at the commencement of a preassigned time position in each of said binary code groups; each of said switches, when enabled, supplying a reference current through its associated network resistor to said apparatus input for comparison with an amplitude sample, the net summation of said amplitude sample and said reference currents being conveyed through said other branch of said apparatus to said apparatus output and thence, through said delay circuit, to said one of each of said "AND" gate inputs; first circuit means operating in logical response to associated ones of said bistable circuits for reducing the ohmic values of predetermined ones of said network resistors at predetermined pulse positions in said pulse groups when said pulse positions undergo predetermined transitions from one to the other of said two possible pulse values; and second circuit means also operating in logical response to said associated ones of said bistable circuits for rendering the impedance looking back from said apparatus input through said one branch of said apparatus constant at all times.

References Cited in the file of this patent

UNITED STATES PATENTS

| | | |
|---|---|---|
| 2,531,846 | Goodall | Nov. 28, 1950 |
| 2,592,308 | Meacham | Apr. 8, 1952 |
| 2,641,740 | Levy | June 9, 1953 |
| 2,660,618 | Aigrain | Nov. 24, 1953 |
| 2,795,650 | Levine | June 11, 1957 |
| 2,839,744 | Slocomb | June 17, 1958 |
| 2,841,649 | Boisvieux | July 1, 1958 |
| 2,889,409 | Carbrey | June 2, 1959 |